United States Patent
Lu et al.

(10) Patent No.: US 9,973,599 B2
(45) Date of Patent: May 15, 2018

(54) PARSER FOR PARSING HEADER IN PACKET AND RELATED PACKET PROCESSING APPARATUS

(71) Applicant: MEDIATEK INC., Hsin-Chu (TW)

(72) Inventors: Kuo-Cheng Lu, Hsinchu (TW); Yuan-Cheng Chuang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 378 days.

(21) Appl. No.: 14/520,350

(22) Filed: Oct. 22, 2014

(65) Prior Publication Data

US 2015/0156288 A1 Jun. 4, 2015

Related U.S. Application Data (60) Provisional application No. 61/911,992, filed on Dec. 4, 2013.

(51) Int. Cl.
*H04L 29/06* (2006.01)

(52) U.S. Cl.
CPC .................. *H04L 69/22* (2013.01)

(58) Field of Classification Search
CPC ................ H04L 45/74; H04L 63/02
See application file for complete search history.

(56) References Cited

U.S. PATENT DOCUMENTS

| | | | | |
|---|---|---|---|---|
| 5,347,484 A * | 9/1994 | Kwong | ............... | G11C 29/808 365/200 |
| 5,751,984 A * | 5/1998 | Chang | .................. | G06F 9/3853 712/216 |
| 7,986,715 B2 * | 7/2011 | Song | ..................... | H04W 24/02 370/470 |
| 8,000,324 B2 * | 8/2011 | Anand | .................... | H04L 49/90 370/389 |
| 2006/0271697 A1* | 11/2006 | Kruse | ............... | H04L 29/08072 709/230 |
| 2007/0171838 A1* | 7/2007 | Baden | ................. | H04L 12/5693 370/252 |
| 2009/0323383 A1* | 12/2009 | Mondaeev | ............. | G11C 15/00 365/49.17 |

FOREIGN PATENT DOCUMENTS

CN  102394872 A  3/2012

* cited by examiner

*Primary Examiner* — Xavier Wong
(74) *Attorney, Agent, or Firm* — Winston Hsu (57) ABSTRACT

A parser is used for parsing a header in a packet. The parser includes a plurality of horizontal field selectors, a plurality of comparators, and a content addressable memory (CAM) based device. Each of the horizontal field selectors is configured to select a first bit group. The comparators are coupled to the horizontal field selectors, respectively. Each of the comparators is configured to compare a first bit group selected by a corresponding horizontal field selector with a designated value to generate a comparison result. The CAM based device is configured to receive a plurality of comparison results generated from the comparators, and use the comparison results as a first input search data.

20 Claims, 7 Drawing Sheets

Parser state table entry (317 bits)

| C_Sel0(5) | C_OP0(1) | C_mask_idx0(5) | C_value_idx0(7) | ..... | C_Sel15(5) | C_OP15(1) | C_mask_idx15(5) | C_value_idx15(7) | V_Sel(5) | V_mask_idx(5) | S_Sel(5) | S_sft_left(1) | S_sft_amt(4) | S_mask_idx(5) | Extra_sft_amt(4) |

Action table entry (93 bits)

| Next_PC(6) | GPR_idx(1) | GPR_value(16) | GPR_mask(16) |
| Fix_sft | Fix_sft_amt(5) | | |
| | Assert_inner_flag | | |
| Cks_mode(3) | L4_cks_sel(3) | | |
| Ext_map(32) | UID(4) | PID(4) | |

PARSER FOR PARSING HEADER IN PACKET AND RELATED PACKET PROCESSING APPARATUS

CROSS REFERENCE TO RELATED APPLICATIONS

This application claims the benefit of U.S. provisional application No. 61/911,992, filed on Dec. 4, 2013 and incorporated herein by reference.

BACKGROUND

The disclosed embodiments of the present invention relate to forwarding packets, and more particularly, to a parser (e.g., a software-defined parser) for parsing a header in a packet and related packet processing apparatus.

A network switch is a computer networking device that links different electronic devices. For example, the network switch receives an incoming packet generated from a first electronic device connected to it, and transmits a modified packet or an unmodified packet derived from the received packet only to a second electronic device for which the received packet is meant to be received. A parser is a key component of the network switch. Specifically, the parser is responsible for packet header extraction by traversing a protocol tree and extracting header fields interested. The parser result is referenced by following packet processing circuits for packet header classification and action command execution. To achieve better packet processing performance, the parser may be implemented using a fixed hardware circuit. However, such a parser design has no flexibility. Thus, there is a need for an innovative parser design with enhanced flexibility.

SUMMARY

In accordance with exemplary embodiments of the present invention, a parser (e.g., a software-defined parser) for parsing a header in a packet and related packet processing apparatus are proposed.

According to a first aspect of the present invention, an exemplary parser for parsing a header in a packet is disclosed. The exemplary parser includes a plurality of horizontal field selectors, a plurality of comparators, and a content addressable memory (CAM) based device. Each of horizontal field selectors is configured to select a first bit group. The comparators are coupled to the horizontal field selectors, respectively, wherein each of the comparators is configured to compare a first bit group selected by a corresponding horizontal field selector with a designated value to generate a comparison result. The CAM based device is configured to receive a plurality of comparison results generated from the comparators, and use the comparison results as a first input search data.

According to a second aspect of the present invention, an exemplary packet processing apparatus is disclosed. The exemplary packet processing apparatus includes a parser and a packet processing circuit. The parser is configured to parse a header of a packet to generate a parser result by extracting at least one user defined field (UDF) from the header, and storing the at least one UDF into a union in the parser result according to a designated union identifier (UID) and a designated protocol identifier (PID). The packet processing circuit is configured to perform a packet processing operation based at least partly on a data structure of the parser result.

According to a third aspect of the present invention, an exemplary method for parsing a header in a packet is disclosed. The exemplary method includes: selecting a plurality of first bit groups; comparing the first bit groups with a plurality of designated values to generate a plurality of comparison results, respectively; and feeding the comparison results as an input search data into a content addressable memory (CAM) based device.

According to a fourth aspect of the present invention, an exemplary packet processing method is disclosed. The exemplary packet processing method includes: parsing a header of a packet to generate a parser result by extracting at least one user defined field (UDF) from the header, and storing the at least one UDF into a union in the parser result according to a designated union identifier (UID) and a designated protocol identifier (PID); and using a packet processing circuit to perform a packet processing operation based at least partly on a data structure of the parser result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes a software-defined parser using a programmable parser state table. In addition, the software-defined parser generates a parser result in a proposed union based structure, where each union in the parser result includes user defined fields extracted from a header of a packet. Hence, the following packet processing circuits, including ingress packet processing circuits and egress packet processing circuits, are configured to operate based on the parser result composed user defined fields arranged in the proposed union based structure. In this way, packet processing with enhanced flexibility can be realized. Further details of the flexible packet processing apparatus using the software-defined parser are described as below.

Figure 1:
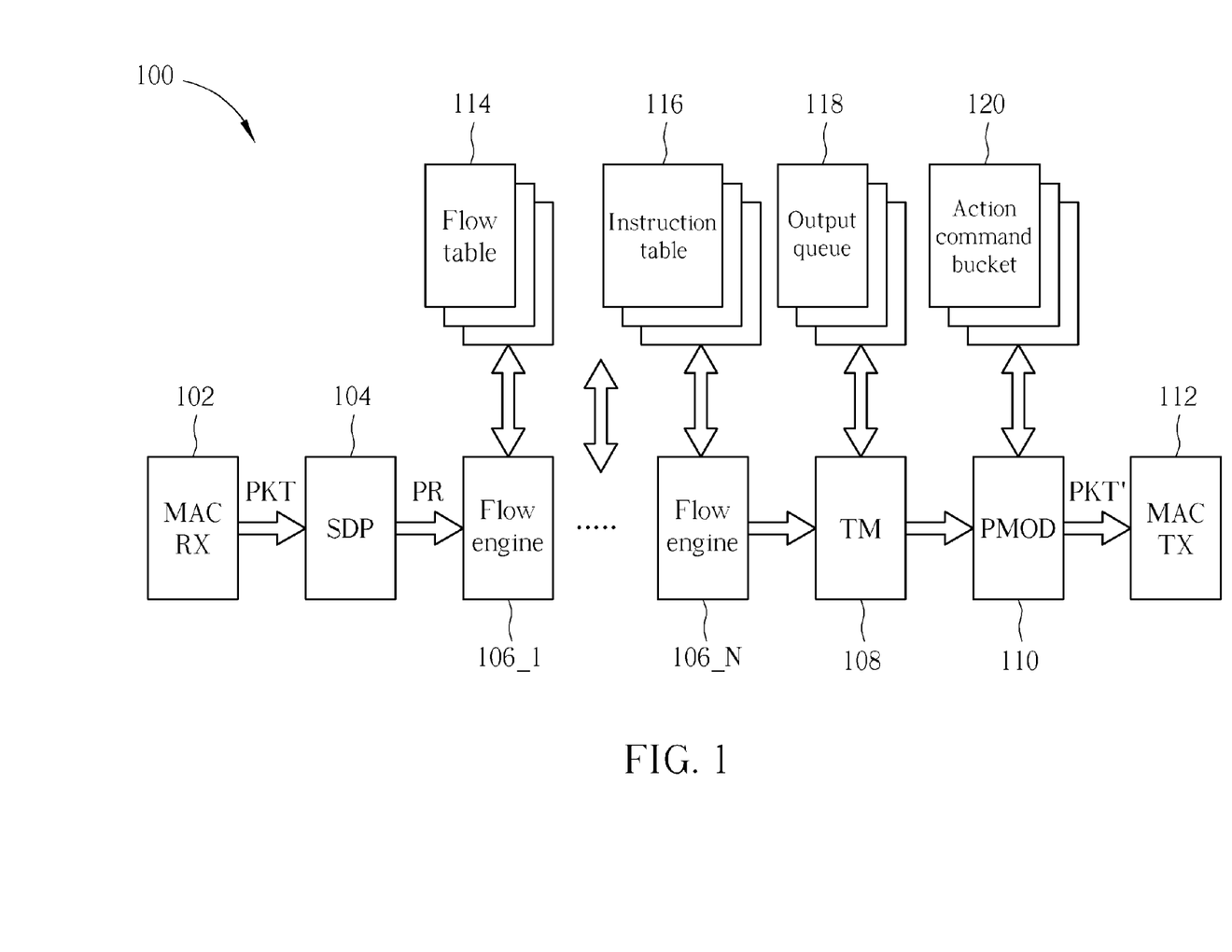
FIG. 1 is a diagram illustrating a flexible packet processing apparatus according to an embodiment of the present invention.

FIG. 1 is a diagram illustrating a flexible packet processing apparatus according to an embodiment of the present invention. By way of example, the flexible packet processing apparatus 100 may be a network switch. As shown in FIG. 1, the flexible packet processing apparatus 100 includes a media access control (MAC) layer receiving interface (denoted as "MAC RX") 102, a software-defined parser (SDP) 104, a plurality of packet processing circuits (e.g., a plurality of flow engines 106_1-106_N, a traffic manager (TM) 108, and a packet modification circuit (denoted as "PMOD") 110), and a MAC layer transmitting interface (denoted as "MAC TX") 112. The MAC layer receiving interface 102 is configured to receive packets (i.e., ingress packets) from ingress ports (not shown), and the MAC layer transmitting interface 112 is configured to forward packets (i.e., egress packets) through egress ports (not shown).

A packet (i.e., an ingress packet) PKT received by the MAC layer receiving interface 102 is processed by the software-defined parser 104 for packet header identification. The software-defined parser 104 generates a parser result PR derived from parsing headers of different protocols in the packet PKT, and provides the parser result PR having extracted packet header information to following packet processing circuits (e.g., flow engines 106_1-106_N). One or more of the flow engines 106_1-106_N may build at least one search key based on the parser result PR of the packet PKT, and use the at least one search key to search flow tables 114 for packet header classification. Based on the packet header classification result, one or more of the flow engines 106_1-106_N may search instruction tables 116 for determining action command(s) for the packet. In addition, one or more of the flow engines 106_1-106_N may build a hash key based on the parser result PR of the packet PKT, and refer to the hash key to selectively perform dynamic load balancing for forwarding an egress packet PKT' generated from the packet PKT.

The traffic manager 108 is configured to deal with at least packet queuing and scheduling. In addition, the traffic manager 108 may be further configured to deal with multicast and associated packet replication. There are output queues 118 corresponding to egress ports of the flexible packet processing apparatus 100, respectively. Based on an egress port through which the packet PKT is to be forwarded, the traffic manager 108 enqueues the packet PKT into a corresponding output queue 118. At a scheduled time point, the traffic manager 108 dequeues the packet PKT from the corresponding output queue 118 to the following packet processing circuit (e.g., packet modification circuit 110). In addition, action command(s) determined by one or more of the flow engines 106_1-106_N may be represented by an action command bucket pointer, and the action command bucket pointer is transmitted to the packet modification circuit 110 via the traffic manager 108. The packet modification circuit 110 is configured to refer to the action command bucket pointer to access one of the action command buckets 120 to find action command(s), and perform the action command(s) to modify header(s) of the packet PKT to generate an egress packet PKT' to the MAC layer transmitting interface 112.

It should be noted that the structure of the flexible packet processing apparatus 100 shown in FIG. 1 is for illustrative purposes only, and is not meant to be a limitation of the present invention. Any packet processing apparatus using the proposed parser design and/or the proposed data structure of the parser result falls within the scope of the present invention. Further details of the software-defined parser 104 and applications using the parser result arranged in the union based structure are described as below.

Figure 2:
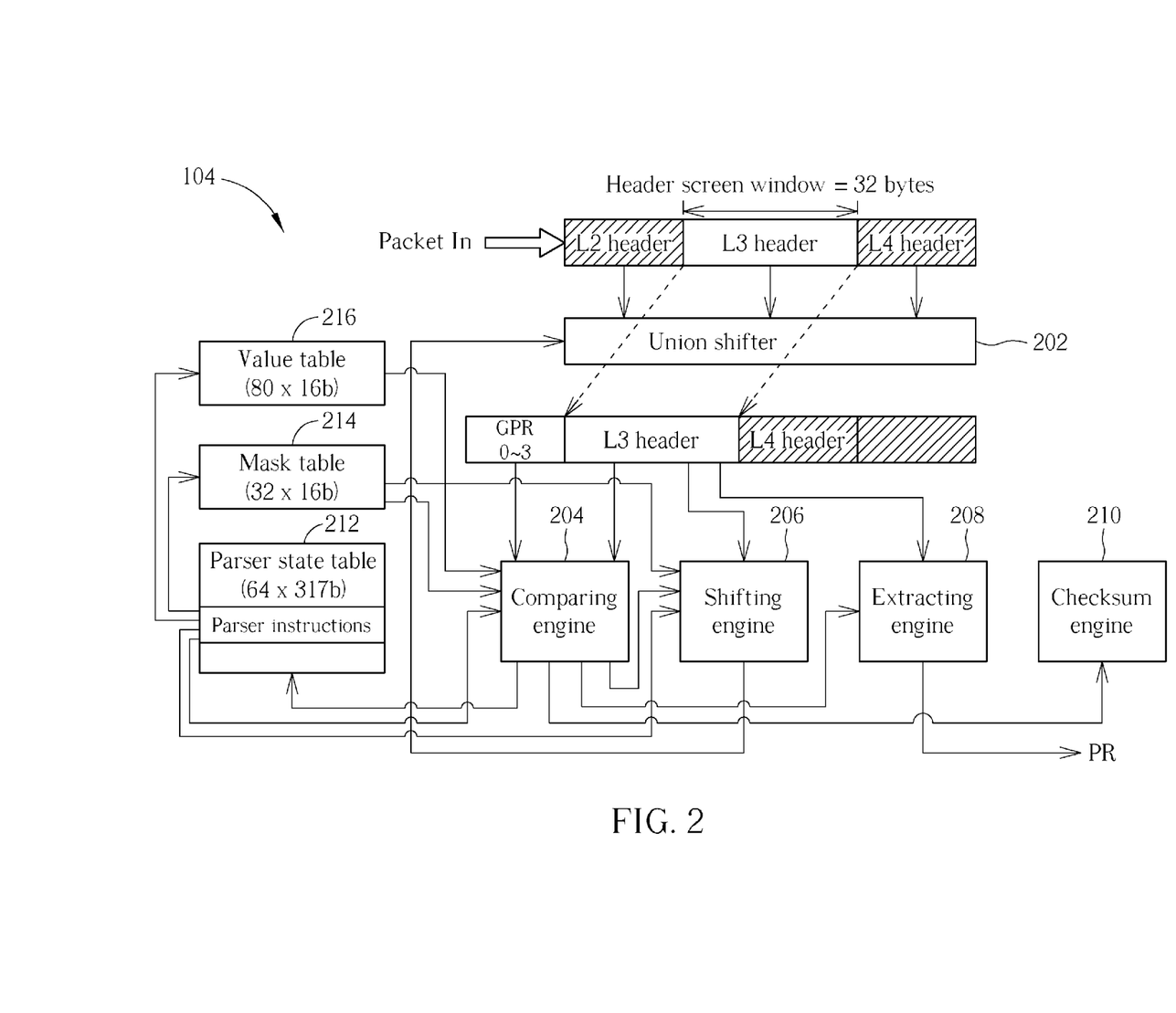
FIG. 2 is a diagram illustrating an example of the software-defined parser shown in FIG. 1.
Figure 3:
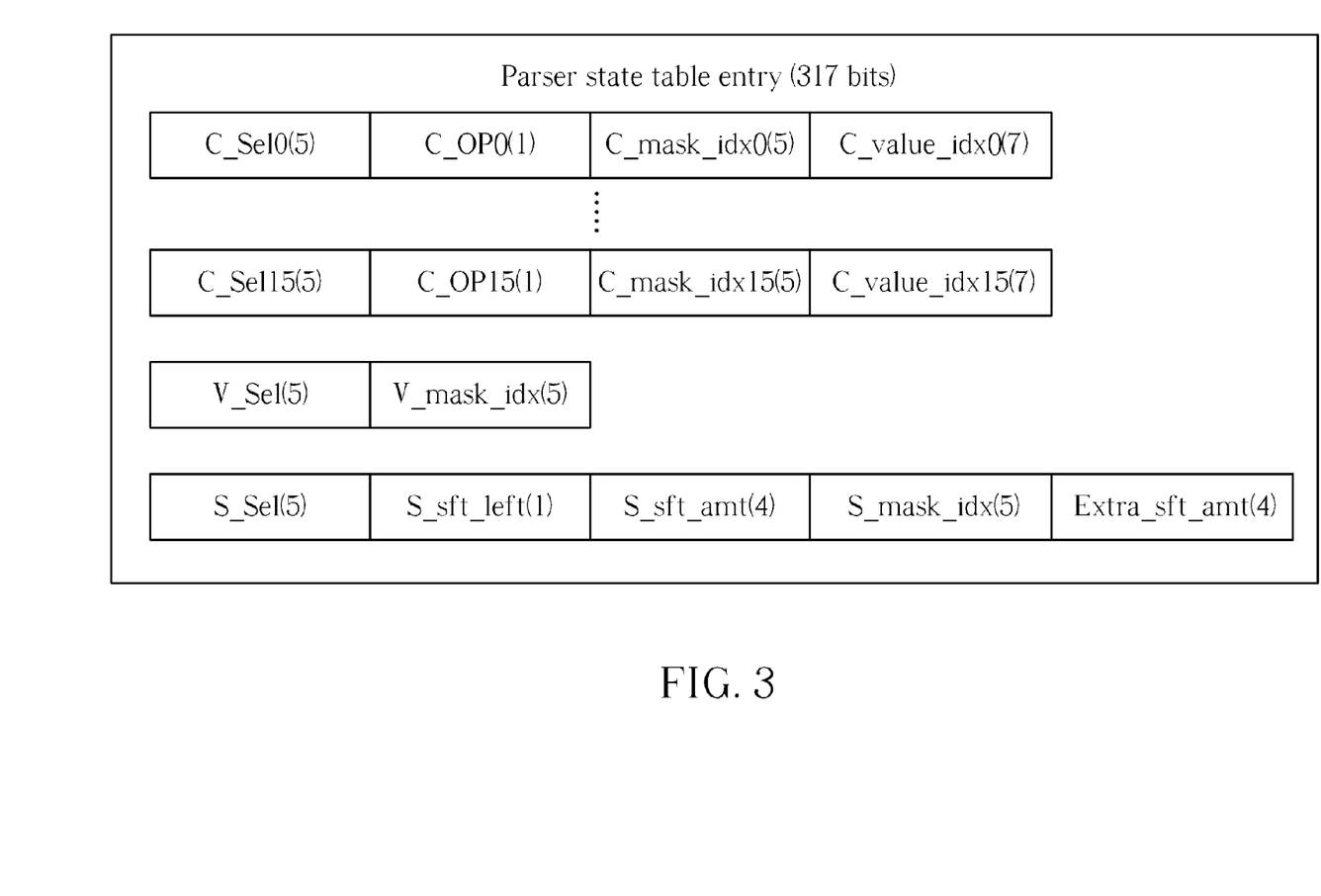
FIG. 3 is a diagram illustrating a data structure of each table entry of the parser state table shown in FIG. 2.

FIG. 2 is a diagram illustrating an example of the software-defined parser 104 shown in FIG. 1. The software-defined parser 104 includes a union shifter 202, a comparing engine 204, a shifting engine 206, an extracting engine 208, a checksum engine 210, and a plurality of programmable tables such as a parser state table 212, a mask table 214 and a value table 216. Since the parser state table 212, the mask table 214 and the value table 216 are programmable, the software-defined parser 104 with enhanced flexibility can be realized. In this embodiment, the parser state table 212 is programmed based on a protocol tree. For example, each table entry in the parser state table 212 records information of one state in the protocol tree. Hence, parser instructions read from one table entry pointed to by a current program counter value Curr_PC are used to configure other circuit components (e.g., comparing engine 204 and shifting engine 206) in the software-defined parser 104 for making the software-defined parser 104 enter a corresponding state in the protocol tree. By way of example, but not limitation, the parser state table 212 is configured to have 64 table entries, each having 317 bits. The data structure of each table entry of the parser state table 212 is illustrated in FIG. 3. The number put in the parenthesis indicates the bit length of each control setting in the parser state table entry. Further description of these control settings recorded in the parser state table entry will be detailed later.

The comparing engine 204 is configured to control the software-defined parser 104 to have a transition from a current state of the protocol tree to a next state of the protocol tree. Hence, the comparing engine 204 may generate a next program counter value Next_PC used to update the current program counter value Curr_PC. More specifically, the comparing engine 204 may check which one of a plurality of predetermined rules is met, and then control header information extraction, layer-4 (L4) checksum verification and state transition correspondingly.

Figure 4:
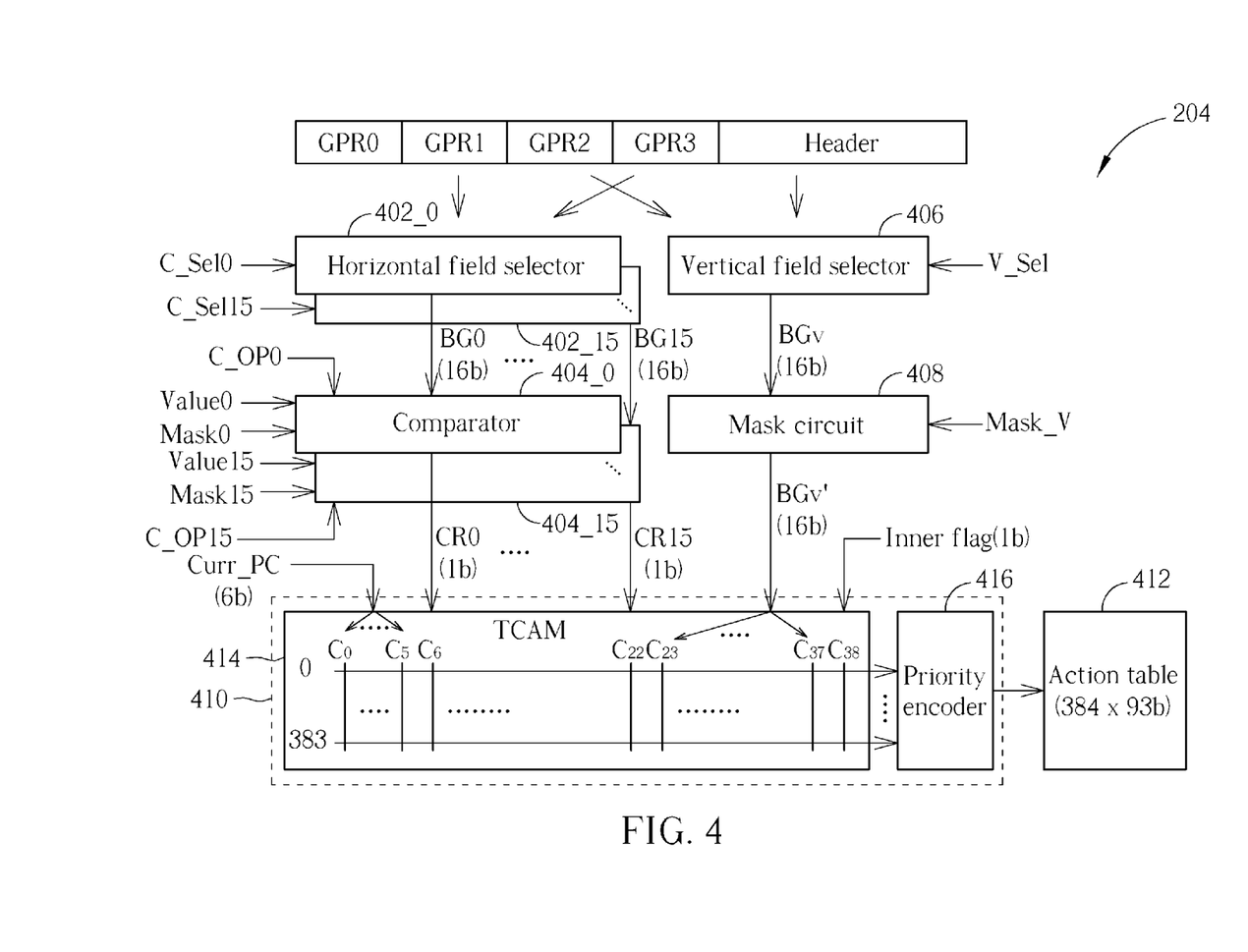
FIG. 4 is a diagram illustrating an example of the comparing engine shown in FIG. 2.

FIG. 4 is a diagram illustrating an example of the comparing engine 204 shown in FIG. 2. The comparing engine 204 includes a plurality of horizontal field selectors 402_0-402_15, a plurality of comparators 404_0-404_15, a vertical field selector 406, a mask circuit 408, a content addressable memory (CAM) based device 410, and an action table 412. In this embodiment, the CAM based device 410 includes a ternary content addressable memory (TCAM) 414 and a priority encoder 416. It should be noted that the number of horizontal field selectors and the number of comparators may be adjusted, depending upon actual design consideration.

The operations of horizontal field selectors 402_0-402_15, comparators 404_0-404_15, vertical field selector 406 and mask circuit 408 are controlled based on control settings recorded in a table entry of the parser state table 212 that is pointed to by the current program counter value Curr_PC. As shown in FIG. 4, the horizontal field selectors 402_0-402_15 are coupled to the comparators 404_0-404_15, respectively. Hence, a combination of one horizontal field selector and one comparator forms one checking circuit used for checking if a bit group (e.g., two bytes (or 16 bits) selected from a data source, including general purpose registers GPR0-GPR3 and a header that is within a header screen window) meets a predetermined rule and accordingly generating a comparison result (e.g., one bit) as one checking result. The horizontal field selectors 402_0-402_15 are controlled by control settings C_Sel0-C_Sel15, respectively. In this embodiment, each of the general purpose registers GPR0-GPR3 has 16 bits (i.e., 2 bytes), and a size of the header screen window is 32 bytes. Since the data source has 40 bytes and each of the horizontal field selectors 402_0-402_15 is used to select two bytes from the data source, each of the control settings C_Sel0-C_Sel15 therefore has 5 bits for indicating which two bytes in the data source should be selected for comparison. Therefore, the horizontal field selectors 402_0-402_15 output bit groups BG0-BG15, each having two bytes, to the comparators 404_0-404_15, respectively.

Each of the comparators 404_0-404_15 is controlled by one operator (which is directly set by one of control settings C_OP0-C_OP15), one designated value (which is configured based on one of control settings C_value_idx0-C_value_idx15), and one designated mask (which is configured based on one of control settings C_mask_idx0-C_mask_idx15). For example, an operator used by one comparator may be "=" or ">". Hence, when C_OP0=0, the comparator 404_0 may be instructed to use the operator "="; and when C_OP0=1, the comparator 404_0 may be instructed to use the operator ">". A designated value used by one comparator is obtained from the value table 216 shown in FIG. 2, and a designated mask used by one comparator is obtained from the mask table 214 shown in FIG. 2.

By way of example, but not limitation, the value table 216 shown in FIG. 2 has 80 table entries, each storing one 16-bit value for comparison; and the mask table 214 shown in FIG. 2 has 32 table entries, each storing one 16-bit bitmap mask used to define locations of interested bits and locations of don't care bits. It is possible that the same 16-bit value may be repeatedly used during the packet header parsing procedure, using the value table 216 to store the 16-bit value and storing the index value of the 16-bit value in the parser state table 212 can reduce the overall table size of the parser state table 212. Similarly, it is possible that the same 16-bit bitmap mask may repeatedly used during the packet header parsing procedure, using the mask table 214 to store the 16-bit bitmap mask and storing the index value of the 16-bit bitmap mask in the parser state table 212 can reduce the overall table size of the parser state table 212.

As shown in FIG. 3, the control settings C_mask_idx0-C_mask_idx15 are used to select designated masks Mask0-Mask15 from the mask table 214 for the comparators 404_0-404_15, respectively. Similarly, the control settings C_value_idx0-C_value_idx15 are used to select the designated values Value0-Value15 from the value table 216 for the comparators 404_0-404_15, respectively. Therefore, based on the setting of a designated mask (e.g., Mask0), all bits of a designated value (e.g., Value0) may be regarded as interested bits during the comparing operation performed by a comparator (e.g., 404_0), or at least one bit of the designated value (e.g., Value0) may be regarded as a don't care bit during the comparing operation performed by the comparator (e.g., 404_0). Specifically, each of the comparators 404_0-404_15 is configured to compare a bit group (e.g., one of BG0-BG15) with a designated value (e.g., one of Value0-Value15) according to a designated mask (e.g., one of Mask0-Mask15), and generate an one-bit comparison result. Therefore, the comparators 404_0-404_15 serve as horizontal comparators to simultaneously output comparison results CR0-CR15, each having one bit, to the TCAM 414.

As mentioned above, each of the horizontal field selectors 402_0-402_15 can be used to select two bytes, and each of the comparators 404_0-404_15 can be used to check if the selected two bytes meet a predetermined rule defined by an operator, a designated value and a designated mask. In this way, 16 rules are checked using the horizontal field selectors 402_0-402_15 and the comparators 404_0-404_15, and 16 checking results (i.e., comparison results CR0-CR15) are inputted into the TCAM 414. The TCAM 414 uses the 16 checking results (i.e., comparison results CR0-CR15) as an input search data of a TCAM search word, and compares the input search data with all entries of the TCAM 414 to determine whether the input search data meets one or more predetermined rules defined by entries of the TCAM 414. Hence, the use of the horizontal field selectors 402_0-402_15 and comparators 404_0-404_15 can enhance the header identification flexibility and/or reduce the complexity and size of the TCAM design.

However, using the horizontal field selectors 402_0-402_15 and comparators 404_0-404_15 may fail to check all rules needed for header identification. For example, when the same two bytes are required to be checked using 16 rules, each of the horizontal field selectors 402_0-402_15 can select the same two bytes, and the comparators 404_0-404_15 can be used to check 16 rules. However, when the same two bytes are required to be checked using more than 16 rules, using the horizontal field selectors 402_0-402_15 and comparators 404_0-404_15 is unable to achieve this goal. In this embodiment, the comparing engine 204 is further configured to support a vertical comparator implemented using part of the TCAM 414.

The vertical field selector 406 is controlled by a control setting V_Sel in a table entry of the parser state table 212 that is pointed to by the current program counter value Curr_PC. As mentioned above, each of the general purpose registers GPR0-GPR3 has 16 bits (i.e., 2 bytes), and the size of the header screen window is 32 bytes. Since the data source has 40 bytes and the vertical field selector 406 is used to select two bytes from the data source, the control setting V_Sel has 5 bits for indicating which two bytes in the data source should be selected for comparison. Therefore, the vertical field selector 406 outputs one bit group $BG_V$, having two bytes, to the mask circuit 408.

With regard to the mask circuit 408, it is controlled by a designated mask Mask_V obtained from the mask table 214 according to a control setting V_mask_idx in a table entry of the parser state table 212 that is pointed to by the current program counter value Curr_PC. The designated mask Mask_V is one 16-bit bitmap mask used to define locations of interested bits and locations of don't care bits. Based on the setting of the designated mask Mask_V, all bits of the bit group $BG_V$ may be regarded as interested bits, or at least one bit of the bit group $BG_V$ may be regarded as a don't care bit. After applying the designated mask Mask_V to the bit group $BG_V$, the mask circuit 408 outputs the bit group $BG_V'$ as an input search data of the TCAM search word.

In addition to bytes included in the header, the vertical field selector 406 and the horizontal field selectors 402_0-402_15 may select bytes included in the general purpose registers GPR0-GPR3. In this embodiment, the general purpose registers GPR0 and GPR1 are readable/writable (R/W) registers, while general purpose registers GPR3 and GPR4 are read-only (RO) registers. Hence, information stored in the general purpose registers GPR0 and GPR1 may be modified by the user. In other words, the general purpose registers GPR0 and GPR1 may be used to store user-defined information. However, information stored in the general purpose registers GPR2 and GPR3 is not allowed to be modified by the user. For example, the general purpose registers GPR2 and GPR3 may be used to store system information, such as port information associated with the packet to be parsed. The system information and/or user-defined information may be operands to be compared in the packet header parsing. Further, parsing packets received from different ingress ports may start from different states in the protocol tree. Hence, an initial value of the current program counter value Curr_PC may be set based on the port information given by the general purpose register GPR0/GPR1, which may save comparison operations.

As known to those skilled in the pertinent art, a TCAM has a TCAM array with a plurality of columns of TCAM cells, where each TCAM cell supports three states "0", "1" and "X (don't care)". The TCAM compares a search word against a table of stored data, and returns the address of each matched data. In other words, in the TCAM, stored data within the TCAM array is not accessed by initially supplying an address, but rather by initially applying the search word to the TCAM array and then performing comparing operations to identify one or more row locations within the TCAM array that contain data matching the applied search word and thereby represent a "match" condition. In this manner, stored data of the TCAM is accessed according to its content rather than its address. As shown in FIG. 4, bits of an input search data composed of the comparison results CR0-CR15 are inputted into a plurality of columns (e.g., $C_6$-$C_{22}$) in the TCAM 414, respectively; and bits of another input search data set by the bit group $BG_V$' are inputted into a plurality of columns (e.g., $C_{23}$-$C_{37}$) in the TCAM 414, respectively. By properly setting TCAM cells, comparison operations for the input search data set by the comparison results CR0-CR15 can be independent of comparison operations for the input search data set by the bit group $BG_V$'.

In addition, the current program counter value Curr_PC may also serve as an input search data of the TCAM search word. Since the parser state table 212 has 64 table entries, the current program counter value Curr_PC therefore has 6 bits. As shown in FIG. 4, bits of the current program counter value Curr_PC are inputted into a plurality of columns (e.g., $C_0$-$C_6$) in the TCAM 414, respectively.

Under certain network environments such as a virtual private network (VPN), a packet may be encapsulated in another packet. Hence, a packet may include an outer header (e.g., a tunnel header), an inner header, and a payload, wherein the outer header is followed by the inner header, and the inner header is followed by the payload. Hence, after parsing the outer header, a parser starts parsing the inner header. In one parser design, a parser state table may include table entries dedicated to parsing the outer header and further include other table entries dedicated to parsing the inner header. However, such a parser design will require a large-sized parser state table, leading to a higher production cost. The outer header and the inner header may have similar header structures, such that the protocol tree of the outer header may be similar to the protocol tree of the inner header. Based on such observation, the present invention therefore proposes setting an inner flag to achieve the objective of reusing table entries in a parser state table for table size reduction.

As shown in FIG. 4, an inner flag is inputted into one column (e.g., $C_{38}$) in the TCAM 414 to serve as an input search data of a TCAM search word. The inner flag is asserted (e.g., inner flag=1) when the software-defined parser 104 is parsing an inner header, and the inner flag is deasserted (e.g., inner flag=0) when the software-defined parser 104 is parsing an outer header. Though at least a portion (i.e., part or all) of table entries of the parser state table 212 may be selected/used during the parsing of the inner header (i.e., when the inner flag is set by a first logic value such as "1") and may also be selected during the parsing of the outer header (i.e., when the inner flag is set by a second logic value such as "0"), the rules checked in the TCAM 414 for parsing the inner header may be different from the rules checked in the TCAM 414 for parsing of the outer header. In this embodiment, TCAM cells located at the column $C_{38}$ are properly set. For example, when a TCAM entry has a TCAM cell at column $C_{38}$ set by the state "0", the rule defined by the TCAM entry is allowed to be involved in parsing the outer header only; when a TCAM entry has a TCAM cell at column $C_{38}$ set by the state "1", the rule defined by the TCAM entry is allowed to be involved in parsing the inner header only; and when a TCAM entry has a TCAM cell at column $C_{38}$ set by the state "X (don't care)", the rule defined by the TCAM entry is allowed to be involved in parsing either of the inner header and the outer header. It should be noted that the inner flag is cleared/deasserted (i.e., inner flag=0) each time a header parsing operation of a packet is accomplished.

Figure 5:
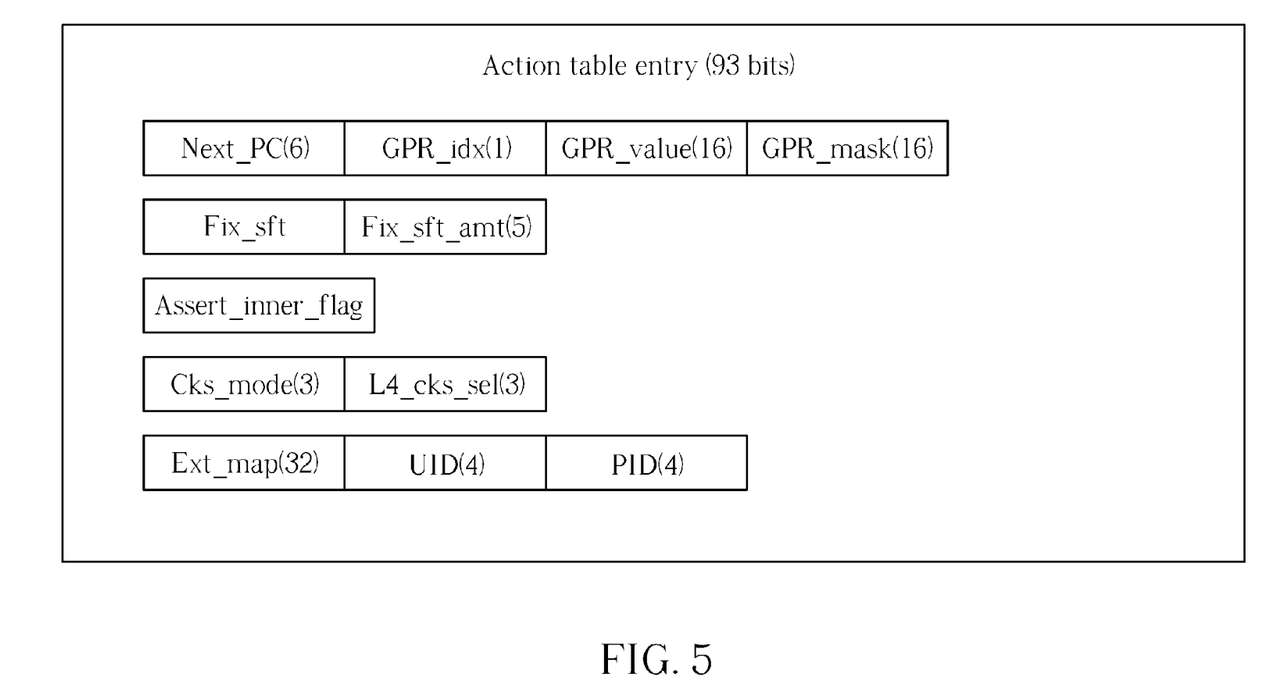
FIG. 5 is a diagram illustrating a data structure of each table entry of the action table shown in FIG. 2.

Since a TCAM cell may be programmed to have a don't care state, it is possible that multiple TCAM entries have the "match" condition under the same TCAM search word. The priority encoder 416 is therefore used to select a matched TCAM entry with the highest priority (e.g., the first matched TCAM entry), and outputs an entry index of the matched TCAM entry with the highest priority to the action table 412. With regard to the action table 412, an action is determined based on the entry index generated from the priority encoder 416. By way of example, but not limitation, the action table 412 includes 384 table entries, each having 93 bits used for defining behavior of an action. In addition, there may be a one-to-one mapping between TCAM entries of the TCAM 414 and table entries of the action table 412. Hence, the number of table entries included in the action table 412 may be equal to the number of TCAM entries included in the TCAM 414. The data structure of each table entry of the action table 412 is illustrated in FIG. 5. The number put in the parenthesis indicates the bit length of each control setting in the action table entry. Further description of these control settings recorded in the action table entry will be detailed as below.

The control setting Next_PC corresponds to a next state in the protocol tree, and therefore points to a location of a next table entry in the parser state table 212 that should be selected/used to parse a next header (e.g., a header of a different protocol). Hence, the current program counter value Curr_PC will be updated by the value specified in the control setting Next_PC.

As mentioned above, the general purpose registers GPR0 and GPR1 are R/W registers. The control setting GPR_idx specifies which of the general purpose registers GPR0 and GPR1 is selected for modification. The control setting GPR_value specifies a value to be stored into the selected general purpose register, either GPR0 or GPR1. The control setting GPR_mask specifies a bitmap mask used to define locations of bits in the value specified by the control setting GPR_value that will be actually stored into the selected general purpose register.

The control setting assert_inner_flag is used to configure the aforementioned inner flag. For example, when a next header to be processed is an inner header, the control setting assert_inner_flag will record a first logic value (e.g., assert_inner_flag=1) to assert the inner flag (e.g., inner flag=1);

and when a next header to be processed is still an outer header, the control setting assert_inner_flag will record a second logic value (e.g., assert_inner_flag=0) to deassert the inner flag (e.g., inner flag=0). The control settings Cks_mode and L4_cks_sel are used to configure the checksum engine 210 shown in FIG. 2 for error handling.

The control settings Fix_sft and Fix_sft_amt are used to control the shifting engine 206 shown in FIG. 2 for adjusting a header section read by the union shifter 202. After the parsing of a current header (e.g., a header of a first protocol) is accomplished (i.e., desired header information in the current header is extracted by the extracting engine 208), the software-defined parser 104 proceeds with the parsing of a next header (e.g., a header of a second protocol). The union shifter 202 is required to load a different header section from the packet by shifting to desired bit/byte positions of the packet.

Figure 6:
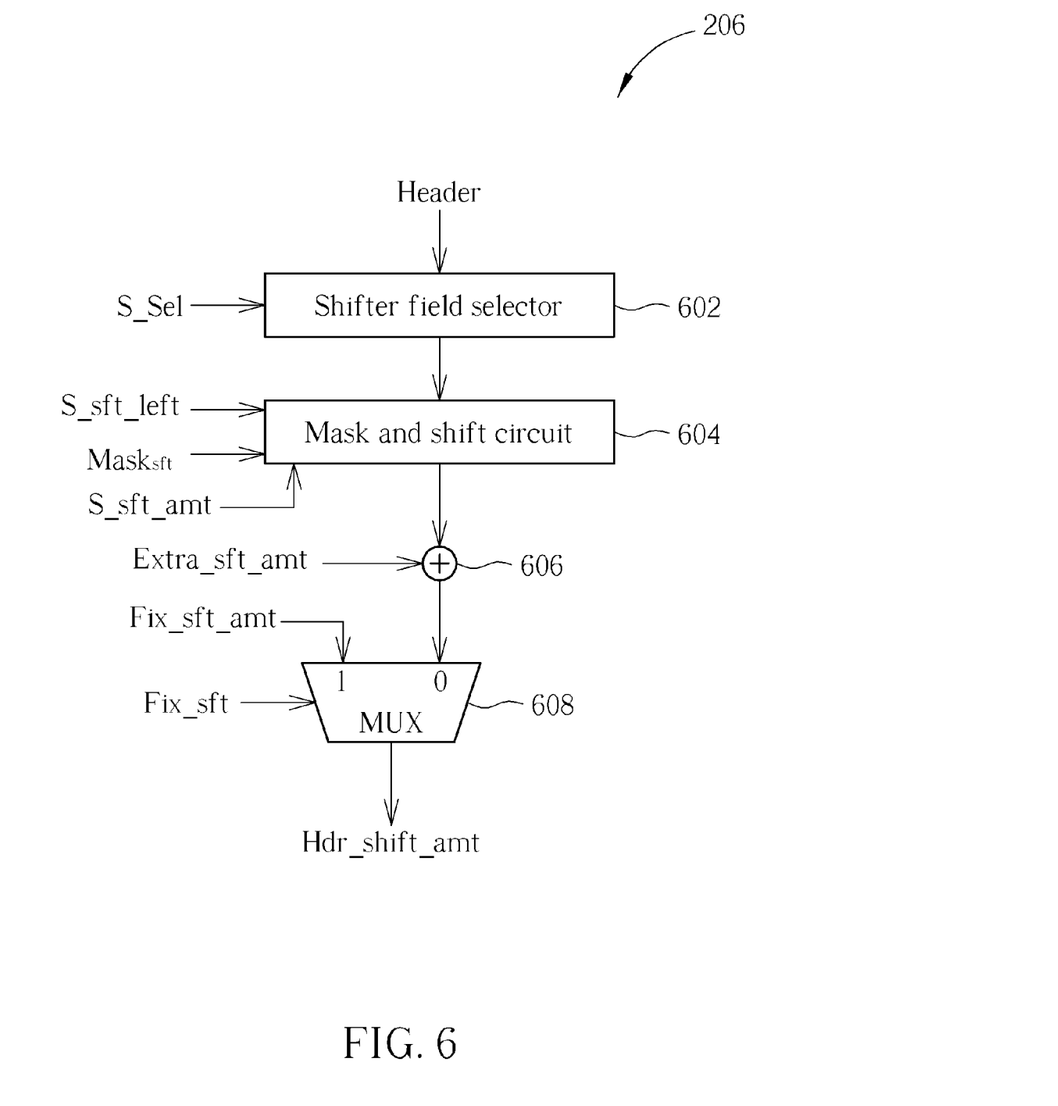
FIG. 6 is a diagram illustrating an example of the shifting engine shown in FIG. 2.

FIG. 6 is a diagram illustrating an example of the shifting engine 206 shown in FIG. 2. In this example, the shifting engine 206 includes a shifter field selector 602, a mask and shift circuit 604, an adder 606, and a multiplexer (MUX) 608. A header field in a current header (which may be a header of one protocol) may include information associated with a location of a next header (which may be a header of another protocol). When the software-defined parser 104 is parsing the current header, control settings S_Sel, S_sft_left, S_sft_amt, S_mask_idx, and Extra_sft_amt recorded in a table entry of the parser state table 212 that is pointed to by the current program counter value Curr_PC are used to configure the shifting engine 206. For example, the control setting S_Sel controls the shifter field selector 602 to select two bytes from the current header. The mask and shift circuit 604 is controlled by a mask $Mask_{sft}$ obtained from the mask table 214 according to the control setting S_mask_idx, and is further controlled by the control settings S_sft_left and S_sft_amt. The mask $Mask_{sft}$ is a bitmap mask used to select interested bits from two bytes selected by the shifter field selector 602. The control setting S_sft_left decides whether the left bit-shifting operation (i.e., a power-of-2 multiplication) is enabled, and the control setting S_sft_amt decides the number of bit positions shifted to the left. The control setting Extra_sft_amt is added to an output of the mask and shift circuit 604 at the adder 606. An output of the adder 606 may serve as a first candidate shift amount for the union shifter 202.

It is also possible that the shifting engine 206 is directly controlled by a fixed shift amount as specified by the control setting Fix_sft_amt recorded in a table entry of the action table 412 that is selected based on the entry index generated from the priority encoder 416. The fixed shift amount may serve as a second candidate shift amount for the union shifter 202. The control setting Fix_sft in the selected action table entry decides whether the shift amount Hdr_shift_amt used by the shifting engine 206 for loading a header section from the packet is set by the first candidate shift amount or the second candidate shift amount. For example, when Fix_sft=1, the shift amount Hdr_shift_amt is set by the second candidate shift amount (i.e., Fix_sft_amt); and when Fix_sft=0, the shift amount Hdr_shift_amt is set by the first candidate shift amount (i.e., output of the adder 606).

When one table entry of the action table 412 that is selected based on the entry index generated from the priority encoder 416, the control settings Ext_map, UID, and PID in the selected action table entry are used to control the extracting engine 208 shown in FIG. 2. In this embodiment, the extracting engine 208 is configured to extract at least one user defined field (UDF) from a current header (e.g., a header of one protocol) based on the control setting Ext_map, and store the at least one UDF into a union in the parser result PR according to a designated union identifier (UID) set by the control setting UID and a designated protocol identifier (PID) set by the control setting PID.

Figure 7:
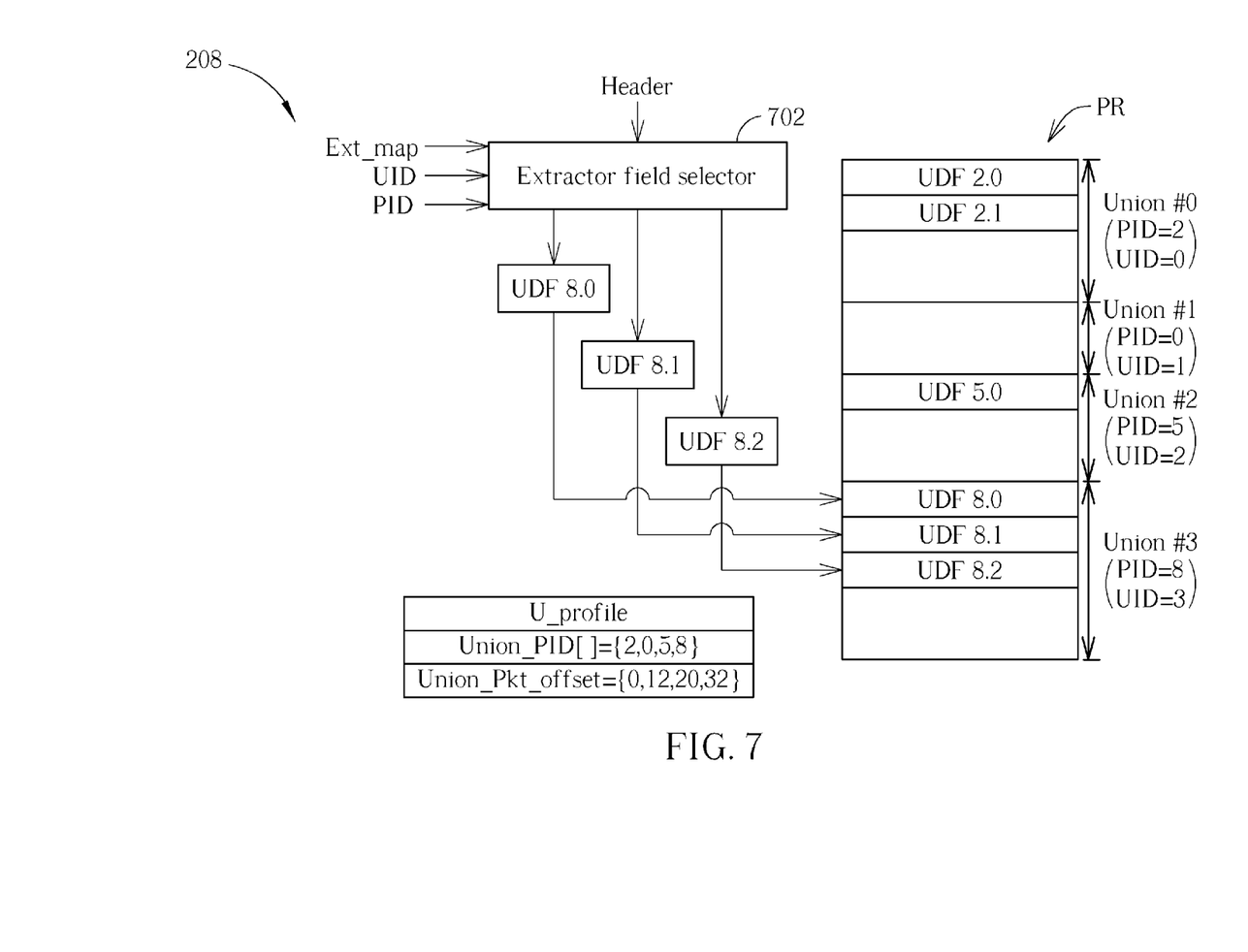
FIG. 7 is a diagram illustrating an example of the extracting engine shown in FIG. 2.

FIG. 7 is a diagram illustrating an example of the extracting engine 208 shown in FIG. 2. The extracting engine 208 includes an extractor field selector 702. The control setting Ext_map is a bitmap that defines which parts should be extracted from the current header. For example, the control setting Ext_map has 32 bits (e.g., bit [0]-bit[31]), each corresponding to a two-byte header field. The header field extraction starts from a beginning position of a header section currently selected by the header screen window. Hence, when the header field extraction is performed by the extracting engine 208, bit [0] may be used as a control signal (i.e., an enable signal) which decides whether the $1^{st}$ two-byte header field (which is composed of the $1^{st}$ byte and the $2^{nd}$ byte of the header section within the header screen window) should be extracted, bit [1] may be used as a control signal (i.e., an enable signal) which decides whether the $2^{nd}$ two-byte header field (which is composed of the $3^{rd}$ byte and the $4^{th}$ byte of the header section within the header screen window) should be extracted, and so on.

It should be noted that the setting of the bit length of the control setting Ext_map is irrelevant to the setting of the size of the header screen window. Hence, the bit count of the control setting Ext_map can be different from the byte count of the header screen window. In this embodiment, each UDF recorded in the parser result PR has a fixed size. For example, the extractor field selector 702 extracts 16 bits (i.e., two bytes) from the current header to generate one UDF. In other words, the UDF is a fixed-sized packet header field (e.g., a 16-bit packet header field) in the parser result PR generated from parsing one packet.

Each union in the parser result PR is identified by a unique UID. By way of example, but not limitation, a union may be used to record UDFs extracted from headers belonging to the same network layer. UDFs in the same union are specified by PIDs. That is, UDFs extracted from a header of a protocol are assigned with a unique PID. For example, when a UDF is extracted from an IPv4 header, PID=1 may be used; and when a UDF is extracted from an IPv6 header, PID=2 may be used. In this way, UDFs extracted from headers of different protocols may be located at the same union and identified by properly assigned PIDs. Further, when a union is empty after the packet header parsing, PID=0 may be assigned to this empty union in the parser result PR.

As shown in FIG. 7, considering a case where the control setting UID in the selected action table entry records UID=3 and the control setting PID in the selected action table entry specifies records PID=8, the extractor field selector 702 refers to the bitmap defined by the control setting Ext_map to extract three UDFs and store the extracted UDFs with PID=8 into the union with UID=3. In other words, a designated PID (i.e., PID=8) is assigned to the third union (i.e., union #3) defined in the parser result PR. By way of example, but not limitation, the parser result PR is allowed to have up to 180 UDFs, up to 26 unions, up to 16 PIDs assigned to the same union, and/or up to 32 UDFs recorded in the same union.

The parser result PR with UDFs arranged in the union-based structure will be used by following packet processing circuits. In addition to the parser result PR, the extracting engine 208 may further generate a union profile U_profile for unions in the parser result PR. As shown in FIG. 7, the union profile U_profile may include two fields Union_PID and Union_Pkt_offset. The first field Union_PID describes which PID(s) in each union, and the second filed Union_Pkt_offset records a physical packet offset for each union. The physical packet offset is indicative of a physical packet location of the first UDF in the union. For example, the physical packet offset may be regarded as an offset between a physical start position of the packet and a physical start position of the union in the packet. The information recorded in the union profile U_profile may be referenced to make modification to the extracted parser result PR and/or the physical packet to be forwarded.

To put is simply, a parser (e.g., the software-defined parser 104) may parse a header of a packet to generate a parser result by extracting at least one user defined field (UDF) from the header, and store the at least one UDF into a union in the parser result according to a designated union identifier (UID) and a designated protocol identifier (PID); and a packet processing circuit (e.g., one of the flow engines 106_1-106_N and the packet modification circuit 110) may perform a packet processing operation based at least partly on a data structure of the parser result. For better understanding of technical features of the present invention, several exemplary applications using the parser result and/or the union profile are discussed as below.

Concerning a first application using the output of the software-defined parser 104, one of the flow engines 106_1-106_N may build a search key according to UDF(s) in a union assigned with a designated UID and a designated PID, where the designated UID and the designated PID are checked to confirm that the UDF(s) are desired UDF(s) needed to build the search key. The search key may be used to search a flow table for a matched field. Next, an action associated with the matched field can be determined correspondingly. That is, at least one action command may be determined by searching the flow table according to the search key.

Concerning a second application using the output of the software-defined parser 104, one of the flow engines 106_1-106_N may build a hash key according to UDF(s) in a union assigned with a designated UID and a designated PID, where the designated UID and the designated PID are checked to confirm that the UDF(s) are desired UDF(s) needed to build the hash key. The hash key may be used for ECMP (Equal Cost Multipath)/LAG (Link Aggregation Group) load balancing. That is, the hash key may be referenced to selectively perform dynamic load balancing.

Concerning a third application using the output of the software-defined parser 104, incremental packet parsing (e.g., software assisted parsing) may be performed after actions between flow engines. For example, one of the flow engines 106_1-106_N may determine at least one action command for modifying a specific header of a first protocol to convert the specific header into a second protocol different from the first protocol. To ensure normal functions of following flow engines, the flow engine may modify the parser result PR by changing a designated PID assigned to a union having UDFs extracted from the specific header. Hence, after the PID modification is done, the union having UDFs extracted from the specific header is assigned with a PID of the second protocol.

Concerning a fourth application using the output of the software-defined parser 104, one of the flow engines 106_1-106_N may modify the parser result PR composed of extracted packet header information. Since UDFs are recorded in the parser result PR in a union based structure, the UDF modification may be made based on a UID of a target union and an UDF offset of a target UDF in the target union. For example, when the second UDF (i.e., UDF 8.1) in the third union (i.e., union #3) in the parser result PR shown in FIG. 7 requires modification, at least one command with parameters {UID=3, UDF offset=2} may be executed.

Concerning a fifth application using the output of the software-defined parser 104, the packet modification circuit 110 may modify a physical packet dequeued from an output queue 118 before transmitting the physical packet to the MAC layer transmitting interface 112 for packet forwarding. Since UDFs are recorded in the parser result PR in a union based structure, the packet modification circuit 110 may refer to information in the union profile U_profile to apply modification to a target header in the physical packet. For example, the packet modification may be made based on a UID of a target union and a packet offset, wherein a physical packet offset of the target union with the UID is obtained from the union profile U_profile, and at least one action command is applied to a header of the packet according to the physical packet offset plus the packet offset.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A parser for parsing a header in a packet, comprising:
   a plurality of horizontal field selectors, each configured to select a first bit group;
   a plurality of comparators, coupled to the horizontal field selectors, respectively, wherein each of the comparators is configured to compare a first bit group selected by a corresponding horizontal field selector with a designated value to generate a comparison result, and the comparison result output from said each of the comparators is only a single bit that is set to indicate if the first bit group meets a rule defined by at least the designated value; and
   a content addressable memory (CAM) based device, configured to receive a plurality of comparison results generated from the comparators, and use the comparison results as a first input search data fed into the CAM based device.

2. The parser of claim 1, wherein the first bit groups generated from the horizontal field selectors include at least one first bit group having bits read from at least one general purpose register (GPR).

3. The parser of claim 2, wherein the at least one GPR stores port information associated with the packet.

4. The parser of claim 1, further comprising:
   a vertical field selector, configured to select a second bit group;
   wherein the CAM based device is further configured to receive a second input search data derived from the second bit group.

5. The parser of claim 4, wherein bits of the first input search data are inputted to a plurality of first columns in the CAM based device, respectively; and bits of the second input search data are inputted to a plurality of second columns in the CAM based device, respectively; and the first columns are different from the second columns.

6. The parser of claim 5, wherein a flag is set by a first logic value when the header belongs to an inner header, and is set by a second logic value different from the first logic value when the header belongs to an outer header; the flag is inputted to a third column in the CAM based device; and the third column is different from the first columns and the second columns.

7. The parser of claim 4, wherein the second bit group has bits read from at least one general purpose register (GPR).

8. The parser of claim 7, wherein the at least one GPR is configured to store port information associated with the packet.

9. The parser of claim 1, wherein each of the comparators is further configured to compare the first bit group with the designated value according to a designated mask.

10. The parser of claim 1, further comprising:
an extractor field selector;
wherein in response to an output of the CAM based device that is generated due to the first input search data matching at least one CAM entry of the CAM based device, the extractor field selector is configured to extract at least one user defined field (UDF) from the header and store the at least one UDF into a union in a parser result according to a designated union identifier (UID) and a designated protocol identifier (PID).

11. The parser of claim 1, wherein bits of the first input search data are inputted to a plurality of first columns in the CAM based device, respectively; a flag is set by a first logic value when the header belongs to an inner header, and is set by a second logic value different from the first logic value when the header belongs to an outer header; the flag is inputted to a second column in the CAM based device; and the second column is different from the first columns.

12. The parser of claim 1, further comprising:
a parser state table, having a plurality of table entries, each storing control settings of at least the horizontal field selectors and the comparators;
wherein the parser state table has at least one table entry that is selected when the header belongs to one of an inner header and an outer header and is also selected when another header in the packet belongs to another of the inner header and the outer header.

13. A packet processing apparatus, comprising:
a parser, configured to parse a header of a packet to generate a parser result by extracting at least one user defined field (UDF) from the header, and storing the at least one UDF into a union in the parser result according to a designated union identifier (UID) and a designated protocol identifier (PID) wherein the union in the parser result is indexed by the designated UID, the at least one UDF in the union is indexed by the designated PID, and UDFs extracted from headers belonging to different PIDs are stored in a same union of the parser result; and
a packet processing circuit, configured to perform a packet processing operation based at least partly on a data structure of the parser result.

14. The packet processing apparatus of claim 13, wherein the packet processing operation comprises:
building a search key according to the at least one UDF in the union assigned with the designated UID and the designated PID; and
determining at least one action command by searching a table according to the search key.

15. The packet processing apparatus of claim 13, wherein the packet processing operation comprises:
building a hash key according to the at least one UDF in the union assigned with the designated UID and the designated PID; and
referring to the hash key to selectively perform dynamic load balancing.

16. The packet processing apparatus of claim 13, wherein the packet processing operation comprises:
after determining at least one action command for modifying the header, changing the designated PID assigned to the union in the parser result.

17. The packet processing apparatus of claim 13, wherein the packet processing operation comprises:
using the designated UID and an UDF offset to modify one UDF with the UDF offset in the union with the designated UID.

18. The packet processing apparatus of claim 13, wherein the parser is further configured to generate a union profile for unions in the parser result, where the union profile records a physical packet offset for each of the unions; and the packet processing operation comprises:
using the designated UID and a packet offset to modify the header of the packet, wherein a physical packet offset of the union with the designated UID is obtained from the union profile, and at least one action command is applied to the header of the packet according to the physical packet offset plus the packet offset.

19. A method for parsing a header in a packet, comprising:
selecting a plurality of first bit groups;
comparing, by a plurality of comparators, the first bit groups with a plurality of designated values to generate a plurality of comparison results, respectively and a comparison result output from each of the comparators is only a single bit that is set to indicate if a first bit group meets a rule defined by at least a designated value;
feeding the comparison results as an input search data into a content addressable memory (CAM) based device; and
utilizing the CAM based device to compare the input search data with entries of the CAM based device to determine whether the input search data meets one or more rules defined by the entries of the CAM based device.

20. A packet processing method, comprising:
parsing a header of a packet to generate a parser result by extracting at least one user defined field (UDF) from the header, and storing the at least one UDF into a union in the parser result according to a designated union identifier (UID) and a designated protocol identifier (PID), wherein the union in the parser result is indexed by the designated UID, the at least one UDF in the union is indexed by the designated PID, and UDFs extracted from headers belonging to different PIDs are stored in a same union of the parser result;
outputting the parser result to at least one of a plurality of packet processing circuits, wherein said at least one of the packet processing circuits is configured to perform a packet processing operation based at least partly on a data structure of the parser result; and
utilizing the packet processing circuits to control generation and transmission of an egress packet, wherein the egress packet is derived from the packet.

* * * * *